Jan. 2, 1951  W. C. MARTIN ET AL  2,536,759
ARCH CONSTRUCTION
Filed Dec. 13, 1946  2 Sheets-Sheet 1

INVENTOR.
WILLIAM C. MARTIN
BY DONALD KEITH MACLEOD
Kwis, Hudson, Boughton & Williams
ATTORNEYS Jan. 2, 1951  W. C. MARTIN ET AL  2,536,759
ARCH CONSTRUCTION
Filed Dec. 13, 1946  2 Sheets-Sheet 2

INVENTOR.
WILLIAM C. MARTIN
BY DONALD KEITH MACLEOD

Kwis, Hudson, Boughton & Williams
ATTORNEYS

Patented Jan. 2, 1951

2,536,759

UNITED STATES PATENT OFFICE 2,536,759

ARCH CONSTRUCTION

William C. Martin and Donald Keith Macleod, Wooster, Ohio, assignors to United Steel Fabricators, Inc., Wooster, Ohio, a corporation of Ohio Application December 13, 1946, Serial No. 715,908

1 Claim. (Cl. 61—45)

This invention relates to arched metal structures fabricated from corrugated sheet metal and as one of its objects aims to provide an improved construction for culverts, tunnel-linings and the like, by which the range of application of corrugated sheet metal to arched structures of this kind is greatly increased so that for a given load bearing capacity it is possible to use a lighter or thinner material and, conversely, for a given weight or thickness of the corrugated material it is possible to safely construct an arch of greater span.

Another object of the present invention is to provide an improved construction for fabricated metal arches in which the above mentioned advantages are obtained by the use of sheet metal having corrugations of box-like shape instead of the conventional sinusoidal corrugations.

A further object is to provide an improved arch construction employing a plurality of corrugated metal plates or segments and in which flanged structural members, preferably channel-shaped members, mounted on the ends of the plates provide a novel means for connecting the ends of the plates together in abutting relation.

Still another object is to provide an improved arch construction employing corrugated metal plates in which the side edges of the plates are deflected to form integral angular flanges for connecting purposes extending substantially in the direction of the corrugations and in which channel-shaped members applied to the ends of the plates provide a means for connecting the ends of the plates together in abutting relation.

Yet another object is to provide an improved arch construction of the character mentioned using curved metal plates having flat-sided corrugations which extend in the direction of curvature and present substantially flat tops or opposite sides of the plate and wherein the channel-shaped connecting members applied to the ends of the plates have their flanges disposed on opposite sides of the plate and welded to such flat tops.

Other objects and advantages of the invention will be apparent from the following detailed description and the accompanying sheets of drawings in which Fig. 1 is a perspective view showing an arch construction embodying the present invention;

Figure 1:
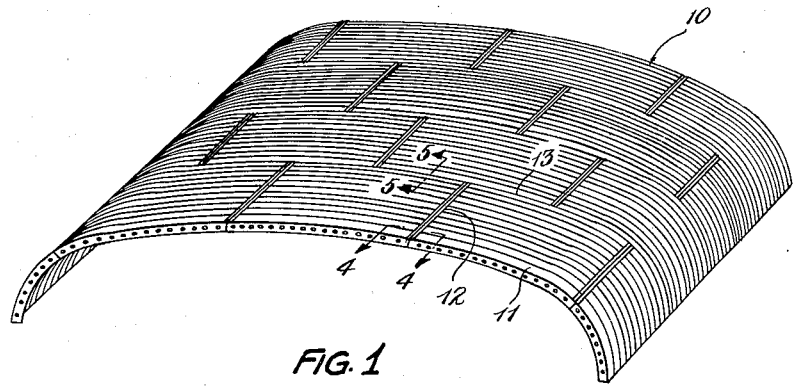
Figure 3:
Fig. 3 is a plan view of the plate.
Figure 2:
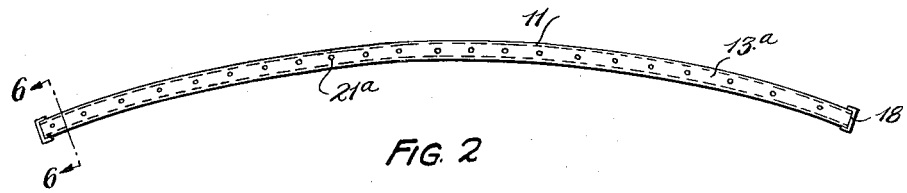
Fig. 2 is an edge view of a curved corrugated plate embodying the invention and adapted to be used as a segment in an arch construction.

As one embodiment of the present invention, Fig. 1 shows an arched structure 10 adapted to be used as a culvert, tunnel-lining or the like, and which has been fabricated from corrugated sheet metal. The arched structure 10 comprises a plurality of contiguous rows of connected corrugated metal plates or segments 11. The plates of each row are connected together in end-to-end relation so as to define an arch and the plates are preferably curved throughout their length so as to provide a desired curvature for the arch. The individual plates may all have the same curvature or, if desired, the plates used in certain portions of the arch may have a curvature which differs from that of plates used in other portions of the arch.

The ends of adjacent plates of each row are connected together by joints 12 which extend longitudinally or axially of the arch and may therefore be conveniently referred to as longitudinal joints. The adjacent edges of the plates of contiguous rows are connected together by joints 13 which extend circumferentially of the structure and are therefore referred to herein as circumferential joints. These longitudinal and circumferential joints 12 and 13 are important features of the invention and will be further described hereinafter.

Figure 6:
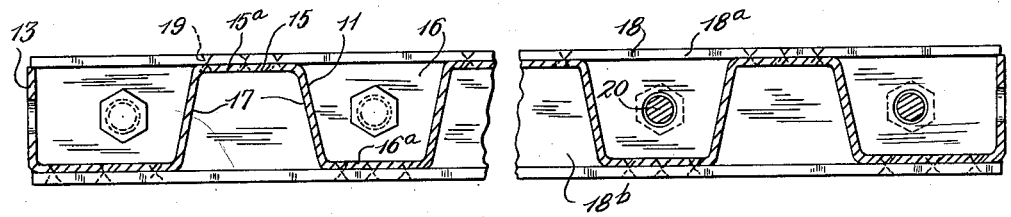
Fig. 6 is a transverse sectional view taken through one of the plates adjacent an end thereof as indicated by line 6—6 of Fig. 2.

As another important feature of the invention we employ in the fabrication of the plates or segments 11 sheet metal having substantially box-like corrugations which greatly increases the strength of the plates and results in an arch construction well suited for heavy duty purposes. The box-like cross sectional shape is illustrated in Fig. 6 of the drawings from which it will be seen that the corrugations are formed by parallel ribs 15 extending longitudinally of the plate and grooves 16 extending longitudinally between the ribs. The ribs 15 have relatively wide flat tops 15a extending therealong and the grooves 16 have relatively wide flat bottom walls 16a extending therealong which are of substantially the same width as the flat tops of the ribs. The ribs 15 also have flat side walls 17 by which the flat tops 15a are integrally connected with the flat bottoms 16a. These ribs and grooves extend throughout the full length of the plate, and when the plate is curved longitudinally as in the case of the plate 11, the ribs extend in the direction of curvature and therefore are also curved. As shown in the drawing, the flat side walls 17 of each rib 15 have a diverging slope at a relatively steep angle.

Figures 4, 5:
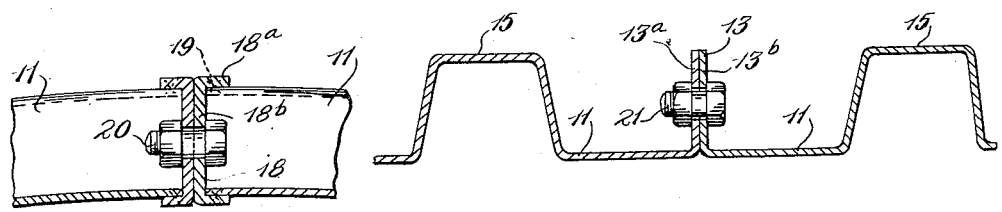
Fig. 4 is a larger scale sectional view taken through one of the longitudinal joints of an arch embodying the improved construction, as indicated by line 4—4 of Fig. 1.
Fig. 5 is a sectional view taken through one of the circumferential joints of the arch as indicated by line 5—5 of Fig. 1.

The plate 11 is provided at the ends thereof with transverse structural members or bars 18 and these members form an important part of the longitudinal joints 12 of the arched structure 10. The structural members 18 are preferably in the form of channel-shaped members, as shown in Fig. 4, which are disposed with their flanges 18a on opposite sides of the plate and with their web portions 18b presented endwise of the plate for abutting engagement with corresponding web portions of an adjacent plate. The channel-shaped members 18 are thus mounted on the plate 11 in such a manner that the ends of the plate extend into the channel recesses of these members and engage the bottoms of such recesses. These channel-shaped members are of a width such that the flanges 18a thereof will lie snugly against the flat tops 15a of the ribs 15 of the corrugated metal plate. The channel-shaped members are retained on the ends of the metal plate 11 by having the flanges 18a connected with the flat tops of the ribs by suitable welding, such as the spot welds indicated at 19 in Figs. 4 and 6.

When the channel-shaped members 18 are mounted on the ends of the plates 11 in the manner just described it will be seen that their web portions 18b provide abutting faces of substantial area and can be clamped together by rows of bolts 20, or the like, for connecting the ends of adjacent plates together. Plates or segments having the end construction just described above can be easily and accurately assembled and when embodied in the arch construction 10, as shown in Fig. 1, the ends of the plates will be permanently held in circumferential alignment with each other and will be prevented from relative shifting and from pulling apart or buckling.

As shown in Fig. 5 the circumferential joints 13 comprise integral angular longitudinal edge flanges 13a and 13b on the adjacent plates 11 and which are clamped together in face-to-face relation by connecting members such as the bolts 21. The flanges 13a and 13b extend along opposite side edges of each of the plates 11 and follow the longitudinal curvature thereof. These flanges are preferably formed by angularly deflected longitudinal edge portions of the plate and have rows of spaced holes 21a therein for the connecting members 21.

When the plates 11 are arranged in rows and connected together in end-to-end relation to form the arch 10, the lengths and locations of the plates are so selected that the longitudinal joints 12 of adjacent rows will be in staggered relation as shown in Fig. 1.

When the arch 10 is constructed from sheet metal having the box-shaped corrugations mentioned above, the range or use of corrugated sheet metal for culverts, tunnel-linings and the like, is greatly increased and this is an important advantage because corrugated sheet metal affords a more economical construction for the larger sized arches, as well as for arches intended for heavy duty service, than if they were fabricated by the used of other types of construction. In other words, the use of corrugated sheet metal having box-like corrugations provides an economical construction for arches of this kind such that for a given load bearing capacity it is possible to use a relatively light or thin sheet metal and, conversely, for a given weight or thickness of the corrugated sheet metal it is possible to safely construct an arch of greater span.

Figure 7:
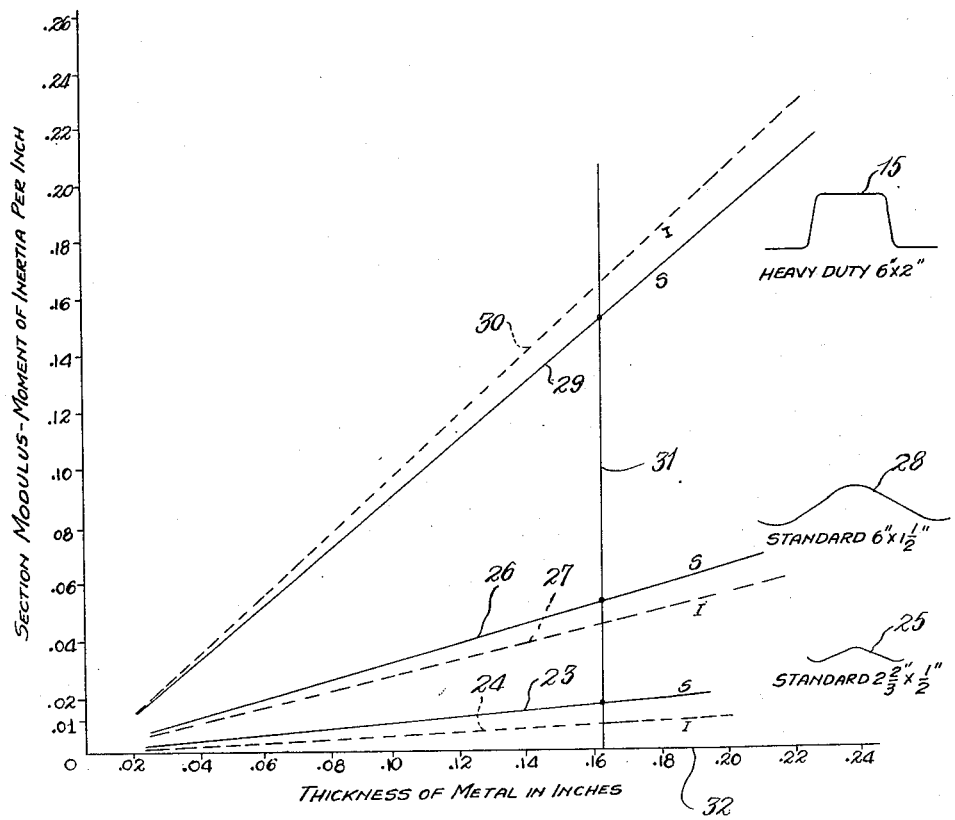
Fig. 7 is a diagram in which sheet metal having the box-like corrugations is compared, as to certain structural properties, with sheet metal having conventional sinusoidal corrugations.

The increased strength and load bearing capacity afforded by the use of sheet metal having the box-shaped corrugations is further illustrated in the diagram of Fig. 7 in which certain structural properties of corrugated sheet metal plates are compared. In this diagram the two principal structural elements or characteristics, namely, section modulus and moment of inertia are charted and compared for different forms of corrugated metal plate. The diagram shows curves 23 and 24 representing the section modulus and moment of inertia for corrugated metal plate having a standard $2\frac{2}{3}''\times\frac{1}{2}''$ corrugation 25 of sinusoidal shape. The diagram also shows a pair of similar curves 26 and 27 for corrugated metal plate having a standard $6''\times1\frac{1}{2}''$ sinusoidal corrugation 28.

For comparison with the two pairs of curves just mentioned the diagram of Fig. 7 also shows curves 29 and 30 representing the section modulus and moment of inertia of corrugated metal plate having the above described box-like corrugations 15. From this diagram it will be observed that the slope of the curves 29 and 30, representing the section modulus and moment of inertia for the box-like corrugations 15, has a much steeper angle than the corresponding curves for the sinusoidal corrugations 25 and 28. For comparison purposes the values of the section modulus and moment of inertia can be readily obtained from the pairs of curves for the respective corrugations 25, 28 and 15 by drawing a vertical line 31 upwardly from the base line 32 at the point of the latter which represents the thickness of the sheet metal used in the corrugations. The line 31 in this instance rises from the base line 32 at the point corresponding with an eight gauge thickness for the sheet metal used in the corrugations. From the values shown by the diagram to exist for the section modulus and moment of inertia of the sheet metal having the box-like corrugations, it is apparent that the arch 10 when fabricated from this form of corrugated sheet metal will have greater strength and load bearing capacity.

From the foregoing description and the accompanying drawings it will now be recognized that this invention provides an improved construction for corrugated sheet metal culverts, tunnel-linings, and the like, and for plates or segments intended to be used in arch constructions of this kind. It will also be seen that the used of corrugated sheet metal having box-like corrugations in these structures affords important advantages and economies. Furthermore, it will be seen that the novel connections or joint constructions disclosed for the longitudinal and circumferential joints of an arch construction of this kind contribute to the strength and accuracy of the structure and enable the same to be more easily assembled from prefabricated segments.

Although the improved arch construction provided by this invention has been illustrated and described herein to a detailed extent, it will be understood of course that the invention is not to be regarded as correspondingly limited in scope but includes all changes and modifications coming within the terms of the appended claim.

Having thus described our invention, we claim:

Tunnel lining comprising, an arcuately extending row of curved corrugated metal plates connected together in end-to-end relation and defining a curved arch, said plates having parallel ribs and intervening open grooves forming the corrugations thereof and extending in the direction of curvature and for the full arcuate length of the plates with the ribs and grooves of adjacent plates in substantially longitudinally registering relation, said ribs having flat tops presented outwardly on opposite sides of said plates, channel-shaped metal connecting members mounted on the ends of said plates and having web and flange portions, said connecting members being disposed with their flange portions on opposite sides of said plates and lying against the flat tops of said ribs and the web portions of the connecting members of adjacent plates being in a face-to-face abutting engagement, welds connecting said flange portions of said connecting members with the flat tops of said ribs, and fastening members extending through the abutting web portions of the connecting members of adjacent plates and located in the open grooves thereof.

WILLIAM C. MARTIN.
DONALD KEITH MACLEOD.

REFERENCES CITED

The following references are of record in the file of this patent:

UNITED STATES PATENTS

| Number | Name | Date |
|---|---|---|
| 596,010 | Baude | Dec. 21, 1897 |
| 2,217,292 | Proctor | Oct. 8, 1940 |